Dec. 16, 1958  H. BLATTER  2,864,991
MECHANICAL CURRENT CONVERTER
Filed Feb. 17, 1954  2 Sheets-Sheet 1

INVENTOR:
Hans Blatter,
BY Pierce, Scheffler & Parker,
ATTORNEYS.

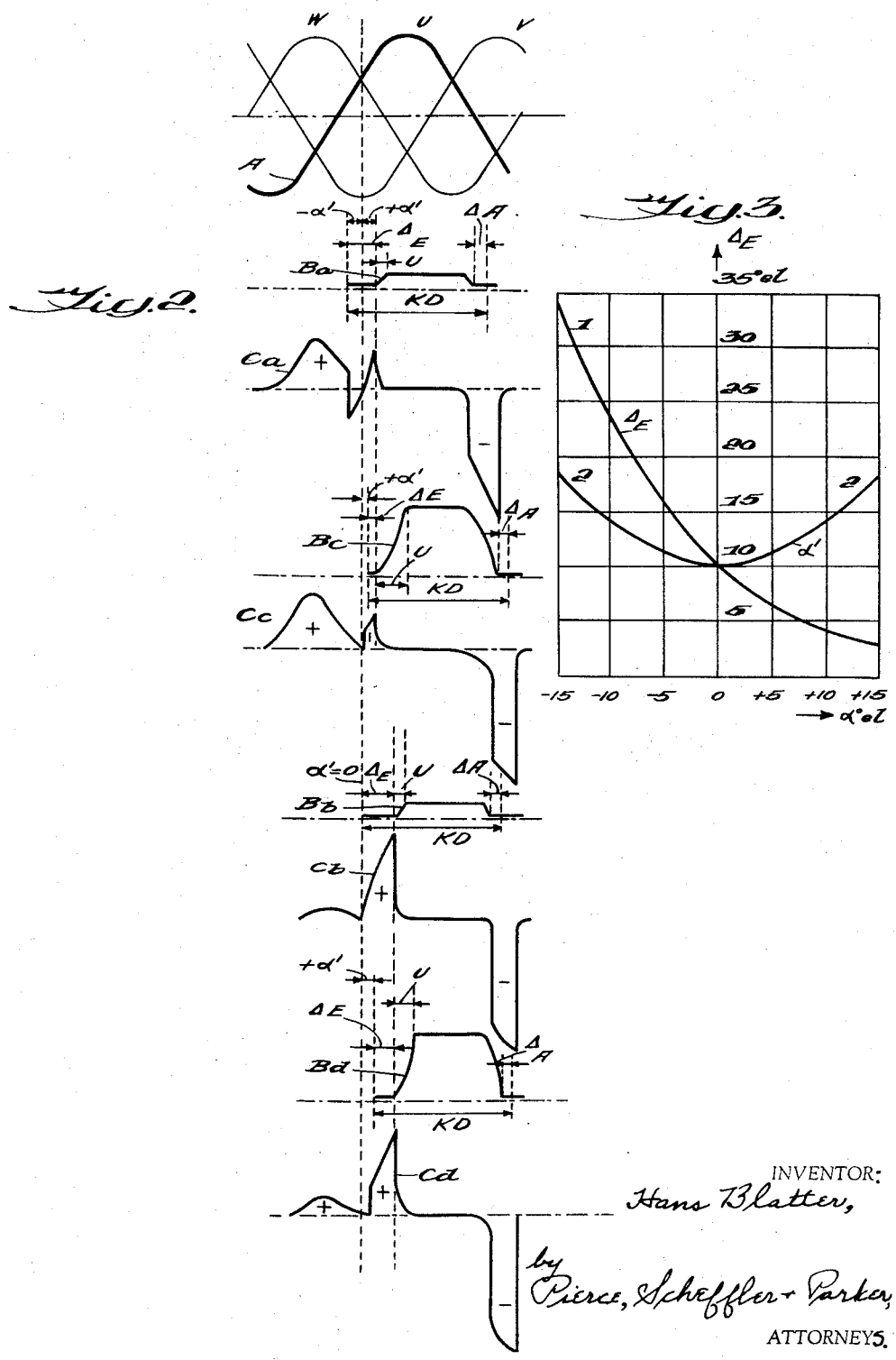

United States Patent Office 2,864,991
Patented Dec. 16, 1958

2,864,991

MECHANICAL CURRENT CONVERTER

Hans Blatter, Wettingen, Switzerland, assignor to Aktiengesellschaft Brown, Boveri & Cie, Baden, Switzerland, a joint-stock company Application February 17, 1954, Serial No. 410,806

Claims priority, application Switzerland February 19, 1953

3 Claims. (Cl. 321—48)

This invention relates to a mechanical current converter or rectifier of the type in which periodically actuated switches control the flow of current from alternating current lines to a direct current load.

In such arrangements, chokes or reactors, commonly known as switch chokes, are provided to develop intervals of reduced current during which the mechanical switches may be closed and opened in a substantially spark-free manner. With a multiphase alternating current supply, the reduced current interval for the phase whose switch contacts are about to close occurs at about the instant that the voltage of that phase is equal to the voltage of the preceding phase whose switch contacts are about to open. For convenience of description, the voltages on adjacent phases whose switches are simultaneously closed at any moment will be referred to as "linked voltages," and their condition of equality will be referred to as one of "zero voltage difference."

It is known to regulate the output direct voltage of such mechanical rectifiers in a manner similar to the regulation of mercury vapor rectifiers, for example by varying the switch closure instants through displacements of the phase of the voltage applied to the driving motor of the switch with respect to phase of the transformer voltage at the switch contacts.

Another known method of regulation consists in leaving the switch closing instants constant at, for example, the moment of equality of the linked voltages of adjacent phases and progressively varying the length of the reduced current period developed by the switch chokes to regulate the rise of the contact voltage and thus regulate the output direct voltage. The disadvantage of these known regulating methods is that simultaneously with the control of the output direct voltage the contact closure period must also be adjusted and this leads to complications in the regulating apparatus as care must be taken, particularly in the second method, that varying the timing of the switch openings does not also vary the timing of the switch closures.

Objects of the invention are to provide mechanical current converters in which the switch chokes are so premagnetized according to varying load conditions that periods of constant contact closure are obtained. Objects are to provide mechanical contact converters in which the output direct voltage is regulated by adjusting the instants of contact closure through control of the phase relation of the voltages applied to the switch operating motor while maintaining a constant duration of the switch closure periods and opening the switches at fixed times within the reduced current intervals for switch opening.

These and other objects and the advantages of the invention will be apparent from the following specification when taken with the accompanying drawings in which:

Fig. 2 is a curve sheet showing certain current and voltage variations with time under different operating conditions; and Fig. 3 is a curve sheet showing the relation between the lead or lag of contact closure and the delay in current flow in the connected phase.

Figure 1:
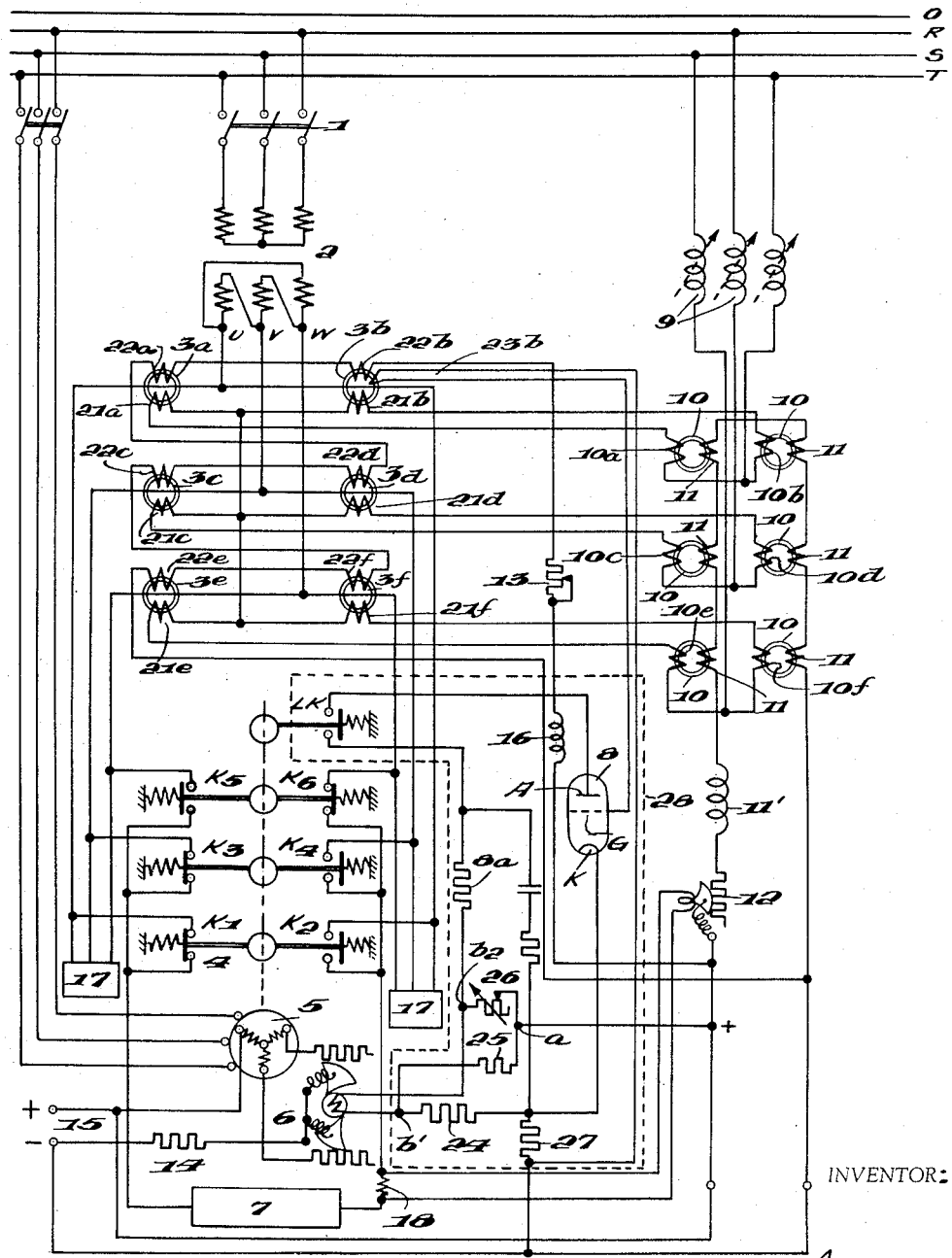
Fig. 1 is a circuit diagram of a mechanical current converter embodying the invention.

As shown in Fig. 1, the three phase alternating current supply lines O, R, S, T are connected through a main switch 1 to a transformer 2 having output phases $u$, $v$, $w$, respectively. Switch chokes, $3a$–$3f$, which are indicated schematically by their cores, are provided on the lines from the transformer secondaries to switches $K_1$–$K_6$ of the rectifier assembly 4, which switches are driven by synchronous motor 5 to control the connection of the alternating current input line to the direct current load 7.

The switch choke cores $3a$–$3f$ are provided with windings $21a$–$21f$, respectively, which receive premagnetizing alternating currents from the supply lines through limiting chokes 9 and regulating chokes $10a$–$10f$, respectively, on cores 10. The cores 10 are premagnetized by direct current windings 11 supplied for example from a source 15 through a choke 11' and a rotary sector regulator 12 having a rotor winding connected across a series resistor 18 in the direct current line. The switch choke cores $3a$–$3f$ may be provided with additional exciter windings $22a$–$22f$ connected across source 15 through an adjustable resistor 13 and choke 16. Adjustment of the direct current in windings $22a$–$22f$ affords a better balance of the premagnetization of the switch chokes at the opening of the switch contacts.

By changing the direct current premagnetization of the chokes $10a$–$10f$ the positive amplitude of the switch choke premagnetization current can be arbitrarily changed in known manner without affecting the negative amplitude. The phase position of the premagnetization current is thereby so adjusted that the varying positive amplitude coincides with the closing of the contacts $K_1$ to $K_6$ while the constant negative amplitude coincides with the opening of the contacts.

Referring now to Fig. 2, the curves $u$, $v$, $w$ indicate the voltages of the transformer secondaries, and the heavy line curve A indicates the voltage of phase $u$ whose contacts are assumed to be about to close. The curves $Ba$–$Bd$ indicate the currents through the contacts of the phase $u$ under different conditions which will be explained, and the curves $Ca$–$Cd$ indicate the corresponding voltages of the switch choke $3a$. The several current curves show a constant switch closure duration KD under the different operating conditions.

$$KD = \Delta E + u + 120 + \Delta A \qquad (1)$$

where $\Delta E$ is the switching-in interval in electrical degrees between the closure of the switch contacts of a phase and the effective delivery of current to the load by that phase; $u$ is the interval in electrical degrees of the overlapping of the closure of switches of adjacent phases, and $\Delta A$ is the interval in electrical degrees between the start of the reduced current interval and the opening of the contacts of a phase.

Curve $Ba$ represents a small current delivered to load 7 at maximum direct voltage. This condition of low current exists in spite of the relatively early closure of the contacts of phase $u$ before its voltage rises to equality with the voltage of the preceding phase $w$. This follows from the small direct current premagnetization of the switch choke $3a$ at the instant of switch closure. The premagnetization is reversed by the phase $w$ current to load 7 and the effective delivery of current of phase $u$ is not initiated until the switch choke $3a$ is again magnetized in its initial sense. Closure of the switch contacts by a lead $-\alpha'$ before equality of the linked voltages thus delays the effective current flow by a lag $+\alpha'$ after voltage equality, where $\alpha'$ is an angle in electrical degrees measured from the instant of equality of the linked voltages of adjacent phases.

The alternating current premagnetization by windings $21a$–$21f$ is so selected, by choice or adjustment of the values of impedance coils 9, that a switch-in interval $\Delta E$ of at least 10 electrical degrees is obtained at the zero voltage difference of the linked voltages. This adjustment of impedance coils 9 is a factory adjustment which is made only once before the converter is placed in operation, as is indicated by the broken line arrows through the coils, and the appropriate impedance values of the coils 9 depend upon the electrical and magnetic properties of the switch chokes $3a$–$3f$.

With increasing values of the angle $\alpha$, the switch-in interval $\Delta E$ decreases according to the relation $$\cos (\alpha_0 + \Delta E) = \cos \alpha_0 - (1 - \cos \Delta E_0) \quad (2)$$

where $\Delta E_0$ is the switch-in interval for an angle $\alpha$ of zero electrical degrees, i. e. when the switch closure is effected at the instant of voltage equality of the adjacent phases. The curve sheet, Fig. 3, is a graphical presentation of the variation of $\Delta E$ with different values $\alpha'$ for angle $\alpha$.

Curve $Bb$ of Fig. 2 shows the variation of current with time for conditions when a small current is supplied to the load 7 at a voltage which is dependent upon the premagnetization of chokes $10a$–$10f$ by direct current under control of the sector regulator 12 which, in turn, is adjusted according to the voltage drop across resistor 18 which is in series with the direct current load 7. Under these conditions, the current increase at the switch contacts is delayed by the relatively heavy premagnetization and the output direct voltage delivered by the transformer is less than under conditions indicated by curve $Ba$.

Curves $Bc$, $Bd$ and the associated curves $Cc$ and $Cd$ show graphically the conditions existing when large currents are delivered at maximum direct voltage and at a voltage controlled by sector regulator 12, respectively.

The timing of the switch operations is preferably so adjusted that at normal load and maximum direct voltage, the contacts close approximately at the instant the linked voltages of adjacent phases are equal, see curves $Bc$ and $Cc$. With decreasing load and thus progressively shorter periods $u$ of overlapping of the closures of contacts of adjacent phases, the switch closure instants are displaced forwardly and the reduction in the overlapping period is compensated by the increased switching-in interval $\Delta E$. Upon oversupply to the load 7, the switch opening instant is displaced backwards, thereby shortening the overlapping periods of switch closures and reducing the output direct voltage. The automatic regulation of the switch opening instants to occur at a preselected point in the reduced current periods is effected by a measuring system of the general type described in the Goldstein et al. Patent No. 2,557,739 and comprises apparatus which will now be described. Reverting to Fig. 1, the switches $K_1$ and $K_6$ are preferably shunted by electronic valves which are indicated schematically by the blocks 17 and connected effectively in parallel with the respective sets of contacts in the manner described in the Goldstein Patent No. 2,583,263. The switches are driven by a synchronous motor 5 having stator windings connected to the alternating current lines R, S, T, and a star-form exciter winding fed from a direct current source 15 through a rotary sector regulator 6 and a limiting resistor 14. Through regulator 6 the current distribution in the exciter winding may be adjusted to vary the location of the magnetic axis of the rotor, thereby to vary the timing of the switch actuations with respect to the voltages at the switch contacts.

The control of regulator 6 is effected by the measuring circuit, shown within the broken line block 28, which includes a gas discharge tube 8 having an anode A upon which a positive voltage is impressed from a direct current, for example source 15 as shown, through serially arranged adjustable resistor 26 and limiting resistor $8a$. The anode circuit includes the contacts of a pilot switch LK which is driven by motor 5 and timed to open and close with one of the current-carrying switches, for example $K_2$ of phase $u$. The rotor winding of regulator 6 is connected between the positive terminal $a$ of adjustable resistor 26 and the junction $b_2$ of resistors 26 and $8a$ by a resistor 25, and the junction $b_1$ of the rotor winding and resistor 25 is connected to the cathode end $c$ of a grid bias resistor 27 by a resistor 24. The control grid circuit extends from the other terminal of resistor 27, through winding $23b$ on switch choke $3b$, to grid G of tube 8.

The grid G is normally biased negatively by the voltage drop across resistor 27 and is fired by a voltage pulse generated in the winding $23b$ during the reduced current interval when switch choke $3b$ is influenced by the linked voltages of phases $u$ and $w$. The anode circuit is closed during periods when switch contacts LK and $K_2$ are closed. During conduction, the peak value of the anode current is determined by the voltage drop across the resistor 24 and the magnitude of the limiting resistor $8a$, and the duration of the conductive period is exactly equal to the interval between the beginning of the reduced current period and the opening of switch contacts $K_2$ of phase $u$.

On closure of the pilot switch contacts LK, the tube 8 is conductive and a pulse of anode current flows through the rotor winding of the regulator 6 and, during intervals when tube 8 is not conductive, the rotor winding current is in the opposite direction, i. e. from terminal $a$ of resistor 25 through adjustable resistor 26 and back to terminal $b_1$ of resistor 24. The regulator 6 remains at rest so long as the average values of these two currents remain equal, that is, so long as the anode current of tube 8 has the preselected value determined by the setting of the adjustable resistor 26. Upon an unbalance of the current values, the regulator 6 is adjusted in accordance with the sense and magnitude of the difference current, and in the general manner disclosed in the aforesaid Patent No. 2,557,739, to insure the opening of the current-carrying contacts at a preselected point in the reduced current interval.

I claim:

1. A mechanical current converter for the transfer of power between multiphase alternating current lines and a direct current line; said converter comprising switch contacts for connecting each alternating current line periodically to said direct current line, motor means for actuating said switch contacts in synchronism with the phases of said alternating current lines, said motor means opening the respective switch contacts at a fixed time interval after each closure thereof, premagnetized switch chokes in said alternating current lines developing intervals of reduced current beginning prior to and extending beyond the instants of equality of the instantaneous voltages on alternating current lines of adjacent phases whose switch contacts are about to be opened and closed respectively, purely electrical control means responsive to the duration of the interval between the beginning of the reduced current interval and the opening of the contact of a phase for adjusting the phase relation of said motor to close said switch contacts at times varying from closure prior to said voltage equalities for small direct current amplitudes to closure subsequent to said voltage equalities at greater current amplitudes, and purely electrical regulating means responsive to the direct current line varying the premagnetization of said switch chokes to alter the duration of the reduced current intervals with varying load in order to control the load of said converter.

2. A mechanical converter as recited in claim 1, wherein said motor means comprises a synchronous motor having a stator with windings energized from said alternating current lines, and a rotor having a star-connected rotor winding energized from a direct current source.

3. A mechanical converter as recited in claim 2, wherein said control means comprises a rotary sector regulator for varying current distribution in said rotor winding to alter the position of the magnetic axis of said rotor with respect to said stator.

References Cited in the file of this patent

UNITED STATES PATENTS

| | | |
|---|---|---|
| 2,181,152 | Rolf | Nov. 28, 1939 |
| 2,225,644 | Koppelmann | Dec. 24, 1940 |
| 2,557,739 | Goldstein et al. | June 19, 1951 |
| 2,557,740 | Goldstein et al. | June 19, 1951 |
| 2,691,128 | Wegener | Oct. 5, 1954 |
| 2,782,359 | Koppelmann | Feb. 19, 1957 |